United States Patent
Haartsen

(10) Patent No.: US 6,405,048 B1
(45) Date of Patent: *Jun. 11, 2002

(54) METHOD AND SYSTEM FOR AUTONOMOUSLY ALLOCATING FREQUENCIES TO A RADIO SYSTEM SHARING FREQUENCIES WITH AN OVERLAPPING MACRO RADIO SYSTEM

(75) Inventor: Jacobus C. Haartsen, Borne (NL)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/019,254

(22) Filed: Feb. 5, 1998

Related U.S. Application Data

(63) Continuation-in-part of application No. 08/847,524, filed on Apr. 24, 1997, now Pat. No. 6,009,332, which is a continuation-in-part of application No. 08/704,846, filed on Aug. 28, 1996, now Pat. No. 5,884,145
(60) Provisional application No. 60/042,113, filed on Mar. 4, 1997.

(51) Int. Cl.[7] .................................................. H04Q 7/20
(52) U.S. Cl. ..................... 455/464; 455/448; 455/450
(58) Field of Search ................................ 375/132, 133, 375/134, 137; 455/450, 451, 452, 454, 462, 465, 447, 448, 449, 464, 444; 370/332

(56) References Cited

U.S. PATENT DOCUMENTS

| | | | |
|---|---|---|---|
| 4,485,486 A | 11/1984 | Webb et al. ................... 455/33 |
| 5,109,528 A | 4/1992 | Uddenfeldt ................. 455/33.2 |
| 5,193,101 A | * 3/1993 | McDonald ................... 455/454 |
| 5,197,093 A | 3/1993 | Knuth ........................... 379/61 |
| 5,203,012 A | 4/1993 | Patsiokas et al. ........... 455/34.1 |
| 5,212,805 A | 5/1993 | Comroe et al. ............. 455/33.1 |
| 5,247,701 A | 9/1993 | Comroe et al. ............. 455/33.1 |
| 5,287,544 A | * 2/1994 | Menich et al. ............... 455/422 |
| 5,301,188 A | 4/1994 | Kotzin et al. .................. 370/50 |
| 5,331,638 A | * 7/1994 | Honkasalo et al. .......... 370/347 |
| 5,402,523 A | 3/1995 | Berg .......................... 455/33.4 |
| 5,428,668 A | 6/1995 | Dent et al. ..................... 379/58 |
| 5,430,761 A | * 7/1995 | Bruckert et al. ............. 375/422 |
| 5,448,754 A | 9/1995 | Ho et al. .................... 455/34.1 |

(List continued on next page.)

FOREIGN PATENT DOCUMENTS

| | | |
|---|---|---|
| EP | 0 740 485 A2 | 5/1992 |
| GB | 2 269 298 A | 7/1992 |
| WO | WO 92/04796 | 3/1992 |
| WO | WO 96/02979 | 1/1996 |
| WO | WO 96/31991 | 3/1996 |
| WO | WO 97/07647 | 2/1997 |

*Primary Examiner*—Vivian Chang
*Assistant Examiner*—Charles N. Appiah
(74) *Attorney, Agent, or Firm*—Jenkens & Gilchrist, P.C.

(57) ABSTRACT

A system and a method to automatically select a frequency set in a low-tier radio communication system, sharing frequencies with an overlapping high-tier cellular radio system, that minimally interferes with the high-tier system employing frequency hopping is described. The present invention makes use of the broadcast information that is transmitted by the high-tier radio base stations on their broadcast control channels (BCCH), which contains not only the BCCH carrier frequencies of surrounding cells, but also information regarding the frequencies applied in the considered cell for frequency hopping traffic channels. With this broadcast information, the low-tier system can derive the frequency planning of the high-tier system, and can then derive a frequency set for low-tier usage that minimally interferes with the overlapping high-tier system. The advantage with this technique is that only measurements on BCCH carriers have to be performed, which are non-hopping, have a constant transmit power, and have a continuous (non-bursty) signal.

26 Claims, 5 Drawing Sheets

|  | RSSI | CA list |
|---|---|---|
| BCCH(A5) | −50 dBm | {1,4,7} |

— 36A

|  | RSSI | CA list |
|---|---|---|
| BCCH(B2) | −60 dBm | {2,5,8} |
| BCCH(B1) | −63 dBm | {2,5,8} |
| BCCH(B4) | −76 dBm | {2,5,8} |
| BCCH(B5) | −100 dBm | {2,5,8} |

— 36B

|  | RSSI | CA list |
|---|---|---|
| BCCH(C4) | −65 dBm | {3,6,9} |
| BCCH(C8) | −68 dBm | {3,6,9} |
| BCCH(C5) | −98 dBm | {3,6,9} |

— 36C

U.S. PATENT DOCUMENTS

| | | |
|---|---|---|
| 5,455,821 A | 10/1995 | Schaeffer et al. .............. 370/17 |
| 5,497,505 A | 3/1996 | Koohgoli et al. .......... 455/34.1 |
| 5,507,034 A | 4/1996 | Bodin et al. ................ 455/34.1 |
| 5,524,280 A | 6/1996 | Douthitt et al. ............... 455/62 |
| 5,526,402 A | 6/1996 | Dent et al. .................... 379/59 |
| 5,535,259 A | 7/1996 | Dent et al. .................... 379/59 |
| 5,537,434 A | 7/1996 | Persson et al. ............. 375/202 |
| 5,539,730 A | 7/1996 | Dent ........................... 370/29 |
| 5,548,807 A | 8/1996 | Ueda ........................ 455/33.1 |
| 5,559,866 A | 9/1996 | O'Neill ..................... 455/33.3 |
| 5,566,358 A | 10/1996 | Obayashi et al. .......... 455/54.1 |
| 5,570,352 A | 10/1996 | Pöyhonenö ................ 370/18 |
| 5,581,548 A | 12/1996 | Ugland et al. .............. 370/330 |
| 5,594,720 A | 1/1997 | Papadopoulos et al. ..... 370/337 |
| 5,594,949 A | 1/1997 | Andersson et al. ........... 455/62 |
| 5,603,085 A | 2/1997 | Shedlo ...................... 455/33.1 |
| 5,740,166 A * | 4/1998 | Ekemark et al. ............ 370/331 |
| 5,774,808 A * | 6/1998 | Sarkoja et al. .............. 455/436 |
| 5,809,059 A * | 9/1998 | Souissi et al. .............. 375/202 |
| 5,862,487 A * | 1/1999 | Fujii et al. ................... 455/454 |
| 5,873,047 A * | 2/1999 | Nakano et al. ............. 455/561 |
| 5,956,642 A * | 9/1999 | Larsson et al. ............. 455/449 |
| 6,009,332 A * | 12/1999 | Haartsen .................... 455/450 |
| 6,023,620 A * | 2/2000 | Hansson .................... 455/419 |
| 6,137,991 A * | 10/2000 | Isaksson ................... 455/67.1 |

* cited by examiner

| | RSSI |
|---|---|
| BCCH(B1) | −63 dBm |
| BCCH(B2) | −60 dBm |
| BCCH(B4) | −76 dBm |
| BCCH(C4) | −65 dBm |
| BCCH(A5) | −50 dBm |
| BCCH(B5) | −100 dBm |
| BCCH(C5) | −98 dBm |
| BCCH(C8) | −68 dBm |

*FIG. 4*

| | RSSI | CA list |
|---|---|---|
| BCCH(A5) | −50 dBm | {1,4,7} |
| BCCH(B2) | −60 dBm | {2,5,8} |
| BCCH(B1) | −63 dBm | {2,5,8} |
| BCCH(C4) | −65 dBm | {3,6,9} |
| BCCH(C8) | −68 dBm | {3,6,9} |
| BCCH(B4) | −76 dBm | {2,5,8} |
| BCCH(C5) | −98 dBm | {3,6,9} |
| BCCH(B5) | −100 dBm | {2,5.8} |

*FIG. 5*

|  | RSSI | CA list |
|---|---|---|
| BCCH(A5) | −50 dBm | {1,4,7} |

36A

|  | RSSI | CA list |
|---|---|---|
| BCCH(B2) | −60 dBm | {2,5,8} |
| BCCH(B1) | −63 dBm | {2,5,8} |
| BCCH(B4) | −76 dBm | {2,5,8} |
| BCCH(B5) | −100 dBm | {2,5,8} |

36B

|  | RSSI | CA list |
|---|---|---|
| BCCH(C4) | −65 dBm | {3,6,9} |
| BCCH(C8) | −68 dBm | {3,6,9} |
| BCCH(C5) | −98 dBm | {3,6,9} |

36C

METHOD AND SYSTEM FOR AUTONOMOUSLY ALLOCATING FREQUENCIES TO A RADIO SYSTEM SHARING FREQUENCIES WITH AN OVERLAPPING MACRO RADIO SYSTEM

RELATED APPLICATIONS

The present invention is a continuation-in-part of Applicant's and assignee's U.S. patent application Ser. No. 08/847,524, entitled "Method and System for Autonomously Allocating a Frequency Hopping Traffic Channel in a Private Radio System", filed Apr. 24, 1997, now U.S. Pat. No. 6,009,332 which is a continuation-in-part of their U.S. patent application Ser. No. 08/704,846, entitled "Method and System For Autonomously Allocating a Cellular Communications Channel For Communication Between a Cellular Terminal and Telephone Base Station", filed Aug. 28, 1996 now U.S. Pat. No. 5,884,145.

BACKGROUND OF THE INVENTION

Field of the Invention

The present invention relates generally to private radio communication systems, which typically cover local indoor residential or business areas. Particularly, the present invention relates to radio communication systems which employ an air-interface compatible to an existing cellular digital Time-Division Multiple Access (TDMA) standard like the Global System for Mobile Communication (GSM) or the Digital Advanced Mobile Telephone Service (D-AMPS). More particularly, the present invention relates to automatic frequency allocation between uncoordinated radio communication systems sharing radio spectrum, particularly between public micro/pico systems or private pico systems sharing frequencies with an overlapping macro cellular network that applies frequency hopping, and methods and communication systems to effectuate the same.

BACKGROUND AND OBJECTS OF THE INVENTION

The past decades have seen a considerable rise in the deployment of mobile telephony. After the slow start of analog standards like AMPS, Nordic Mobile Telephone (NMT) and the Total Access Communication System (TACS), mobile telephony has recently become quite popular in the consumer markets with products employing advanced digital standards like GSM and D-AMPS. In addition to other developments in mobile phone features, like smaller size and longer battery life, much progress has been made at the network side as well, particularly, in frequency reuse schemes to avoid co-channel interference between adjacent cells. Increasingly, dense cell reuse plans have been complemented with hierarchical cell structures, where macrocells cover entire districts (high tiers), microcells cover smaller parts like streets (middle tiers), and picocells cover very small areas the size of a few rooms (low tiers). Important for the hierarchical cell structure is that all the base stations deployed (ranging from macro to pico base stations) are part of the same public land mobile network (PLMN).

In order to avoid co-channel interference between different radio links, a structured channel allocation scheme is applied, i.e., different sets of frequencies are assigned to different tiers with frequency reuse being applied within the respective tiers to maximize radio spectrum usage. Public telephone systems typically operate in a licensed part of the radio spectrum, typically in the 1 GHz and 2 GHz range. The radio spectrum is divided in to two or more bands which are assigned to different operators. One band contains a multiple of radio channels, each centered around a different radio carrier frequency. In a restricted local area, a multitude of mobile users can be served by allocating different radio channels to them. In this way, no cross-interference between the users occurs. This is called Frequency Division Multiple Access (FDMA), and is applied in all analog mobile telephone systems. In the more advanced digital systems, each radio channel contains a number of subchannels in the form of time slots, e.g., FDMA/Time Division Multiple Access (FDMA/TDMA) or a spreading code, e.g., FDMA/Code Division Multiple Access (FDMA/CDMA). Each subchannel can serve a different user. However, since the assigned band is limited, only a limited amount of users could be served with this concept. Frequency reuse has been introduced to solve this limitation: the same radio frequencies are reused at different geographical locations such that minimal cross-interference (co-channel interference) occurs. If the propagation loss between a mobile and its serving base is much smaller than the propagation loss between this mobile and an interfering base, the carrier-to-interference ratio (C/I) at the mobile receiver is sufficient for acceptable link quality.

It should, therefore, be understood that radio systems covering the same geographical area must make use of different frequencies in order to avoid the aforedescribed co-channel interference. In the hierarchical cell structure this is accomplished by assigning different sets of frequencies to different tiers. Within the tiers, frequency reuse is applied in order to maximize the usage of the radio spectrum.

Clearly, the deployment of the reuse concept requires planning efforts at the side of the network operator. The network operator has to plan the frequencies geographically in such a way that the aforedescribed mutual interference is minimized. For the high-tier levels (macro-cells) this is manageable, but when going down in the hierarchical levels, planning becomes more and more a difficult problem due to the unpredictable propagation conditions. In addition, when it comes to private radio systems like described in the aforementioned U.S. Pat. Nos. 5,428,668 and 5,526,402, which share the frequencies with the overlapping cellular environment, the operator has no direct control at all in assigning frequencies at the lowest tier.

Accordingly, proposals have been made for autonomous channel allocation methods in which the radio systems at the lowest tiers (public or private pico systems) autonomously determine which frequencies in the cellular radio spectrum can be reused in the local area for low-tier users. Typically, these low-tier systems periodically perform measurements on different carriers to "learn" the frequency usage of the overlapping (planned) high-tier system. With this information, selection can then be made of frequencies which are locally not used by the high-tier system, and which can therefore be reused by the low-tier system, thereby minimizing co-channel interference between the high-tier and the low-tier systems. Such an autonomous frequency allocation method is described in Applicant's aforementioned co-pending patent applications entitled, "Method and System for Autonomously Allocating a Cellular Communications Between a Cellular Terminal and a Telephone Base Station," U.S. patent application Ser. No. 08/704,846, Aug. 28, 1996, and "Method and system for Autonomously Allocating a Frequency Hopping Traffic Channel in a Private Radio System, U.S. patent application Ser. No. 08/847,524, filed Apr. 24, 1997, which are incorporated herein by reference.

It should be understood that the reliability of the interference measurements performed using the techniques set forth in the above-identified patent applications depends upon the usage of the channels on which the measurements are made. If the channel carries broadcast information, a constant signal is on the channel and reliable interference measurements can be made. In a traffic channel context, however, the signal can be much more bursty, especially in FDMA/TDMA systems. Worst case scenarios in such systems are where the traffic channel is frequency hopping. As is understood to those skilled in the art, when the traffic load is low, the bursty signals on the frequencies have a low duty cycle and measurements become less and less reliable.

It is, therefore, an object of the present invention to provide a system and method to autonomously derive a set of frequencies for use in a low-tier radio system, which minimally interferes with an overlapping high-tier radio system that is applying frequency hopping. The system and method are preferably adaptive in the sense that if the high-tier system is replanned, the low-tier system will automatically adapt to the new conditions and select frequencies that will not compromise the operation of the high-tier system.

SUMMARY OF THE INVENTION

The present invention advantageously provides a system and a method to automatically select a frequency set in a low-tier radio communication system, sharing frequencies with an overlapping high-tier cellular radio system, that minimally interferes with the high-tier system employing frequency hopping. The present invention makes use of the broadcast information that is transmitted by the high-tier radio base stations on their broadcast control channels (BCCH), which contains not only the BCCH carrier frequencies of surrounding cells, but also information regarding the frequencies applied in the considered cell for frequency hopping traffic channels. With this broadcast information, which can be received on the downlink by high-tier and low-tier users alike, the low-tier system can derive the frequency planning of the high-tier system. In addition to this planning information, the low-tier system can measure the signal strengths on the BCCHs of surrounding cells. Together with the planning information, the low-tier system can then form a picture of the geographical usage of the frequencies, and can subsequently derive a frequency set for low-tier usage that minimally interferes with the overlapping high-tier system. The advantage with this technique is that only measurements on BCCH carriers have to be performed, which are non-hopping, have a constant transmit power, and have a continuous (non-bursty) signal.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 4 illustrates a generic list of candidate reusable frequencies;

FIG. 5 illustrates an ordered list of the candidate reusable frequencies of FIG. 4;

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
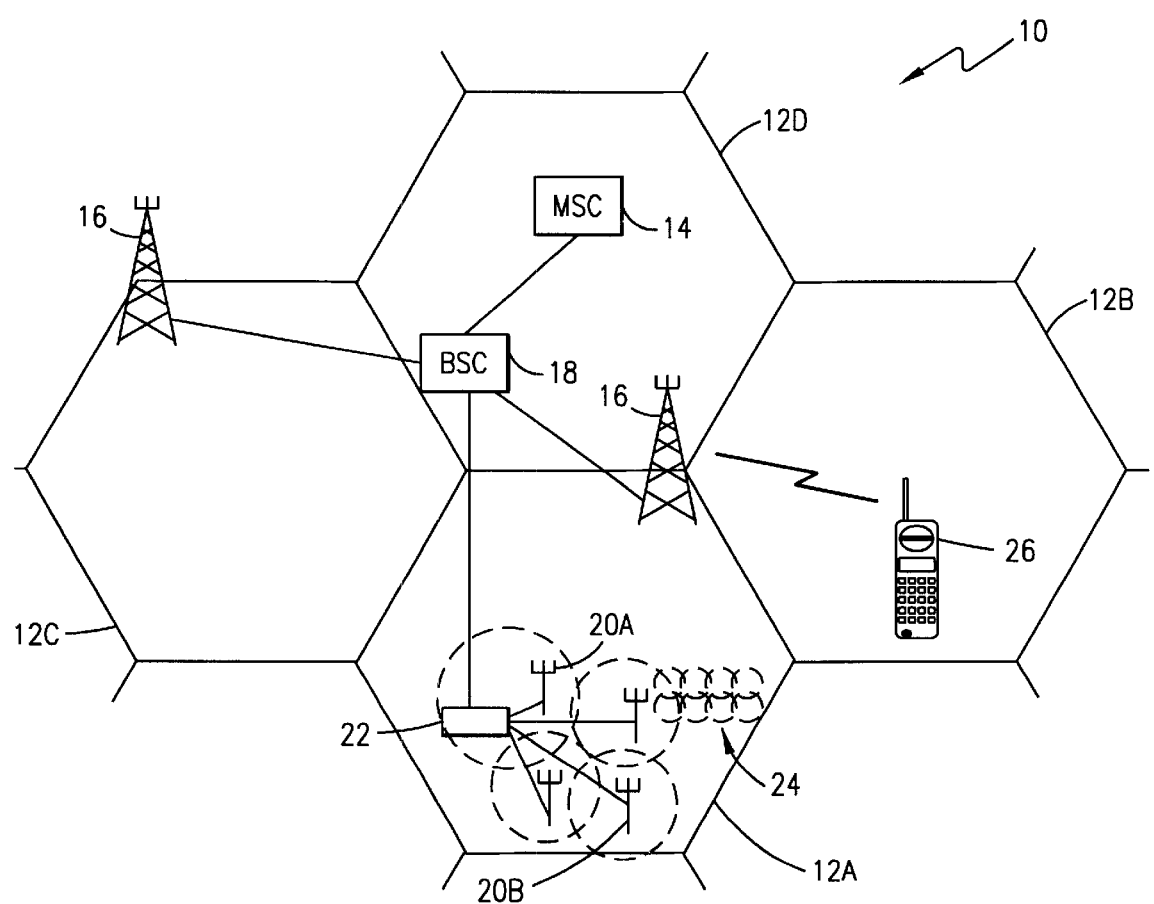
FIG. 1 is a schematic illustration of a hierarchical cell structure showing both micro and pico base transceiver systems within a cellular network.

Today's public cellular networks deploy frequency reuse in order to make optimal usage of the radio spectrum. Frequency reuse guarantees that a frequency used in one cell is not reused in a cell nearby but only in cells at a certain distance away. The propagation loss the interfering signal experiences is preferably sufficiently large such that the carrier-to-interference ratio in the considered cell is high enough for acceptable radio operation to occur therein. Frequency reuse provides the capability to cover large geographical areas with only a limited amount of radio spectrum. In addition to frequency reuse, modern public cellular networks deploy cell hierarchy, as discussed hereinabove. At the high tier, there are macro base stations covering entire districts; at the medium-tier, there are micro base stations covering smaller areas like streets or shopping malls; at the lowest tier, there are pico base stations and private residential (home) base stations covering very small areas the size of a few rooms. FIG. 1 illustrates this hierarchical cell concept.

Referring now to FIG. 1, there is illustrated a portion of a wide-area wireless communication system, generally designated by the reference numeral 10, divided into a number of conventional cells 12A, 12B, 12C, 12D, etc., forming, for example, a cellular network. A Mobile Services Center (MSC) 14 governs communications over the system 10 through contact with various base transceiver systems (BTSs) 16, illustrated for simplicity as a radio tower, preferably via a base station controller (BSC) 18 which coordinates the actions of the various BTSs 16, providing radio coverage within the cells 12. As discussed, at this high tier of network hierarchy, the "macro" BTSs 16 cover district areas represented by the cells 12, e.g., cell 12A.

As shown in FIG. 1, the BSC 18 is in contact with the BTSs 16, within system 10, as well as "micro" base transceiver systems (MBTSs), generally designated by the reference numeral 20, preferably via a micro base station controller (MBSC) 22. As noted, these MBTSs 20, at a middle tier of network hierarchy, cover portions of the overlaying cells 12. For example, MBTS 20A covers a discrete portion of cell 12A and MTS 20B spans a portion of cell 12A as well as a portion of another adjacent cell.

At the lowest tier are various "pico" base transceiver stations (PBTSs), generally designated by the reference numeral 24, which more finely divide the overlaying cellular configuration of system 10. As shown in FIG. 1, discrete PBTSs 24 cover very small areas within the cell 12 and may overlap each other as well as the somewhat larger MBTSs 20. The PBTSs 24, unlike the MBTSs 20, are not wirelined with the BSC 18 and are thus not coordinated with the operations within the cell 12. It should, of course, be understood that although the various MBTSs 20 are shown connected to the BSC 18 (via the aforedescribed MBSC 22), the MBTSs 20 may instead, as with the PBTSs 24, operate independently of the BSC 18. of course, co-channel interferences will arise unless the pico systems 24 (as well as any independent micro systems 20) coordinate channel selection with the higher tiers, avoiding co-channel interferences.

A mobile station (MS) 26 is also shown in cell 12B in FIG. 1. The MS 26 is shown in wireless communication with one of the BTSs 16. MS 26 is the physical equipment, e.g., a car phone or other portable phone, used by mobile subscribers to communicate with the cellular network 10, e.g., to other MSs 26 in the system 10 or to users within the micro systems 20 via the MBSC 22. The pico systems 24 preferably contact other users via a conventional Public Switched Telephone Network (PSTN), not shown.

Usually, different tiers are assigned different sets of frequencies in order to prevent interference between the tiers. For example, for the three public tiers, i.e., the aforedescribed macro, micro and pico layers or tiers, three disjunctive sets of frequencies are typically assigned to the different tiers. Within a particular tier, frequencies are preferably reused geographically in such a way that minimal co-channel interference results. The frequency reuse concept, however, requires a lot of frequency planning which has to be carried out by the network operator. As noted, however, when moving down in the hierarchical cell structure, planning becomes more and more difficult due to the unpredictable propagation paths in the lower tiers. Therefore, frequency allocation schemes that operate automatically in the lower tiers are becoming of interest since they relieve the operator of the burden to plan the network. These schemes, however, must be adaptive to automatically adapt to changing environmental conditions. Furthermore, autonomous schemes are mandatory in radio systems over which the operator has no direct control like private, residential systems. In addition, local conditions may indicate that frequencies from a higher tier may be reused within a lower tier with minimal cross-interference, thereby increasing capacity.

Adaptive frequency allocation schemes in low-tier systems must make use of measurements performed on the carriers in the radio spectrum to derive which carriers the higher-tier system is using. Periodic Received-Signal-Strength-Indication (RSSI) measurements on a carrier show the activity and nearness of a system applying this carrier. Uplink measurements performed by the low-tier base station and downlink measurements performed by either the low-tier base station and/or the low-tier mobile station reveal the local usage of the carriers by the high-tier system, as is described in Applicant's aforementioned co-pending patent applications.

Figure 2:
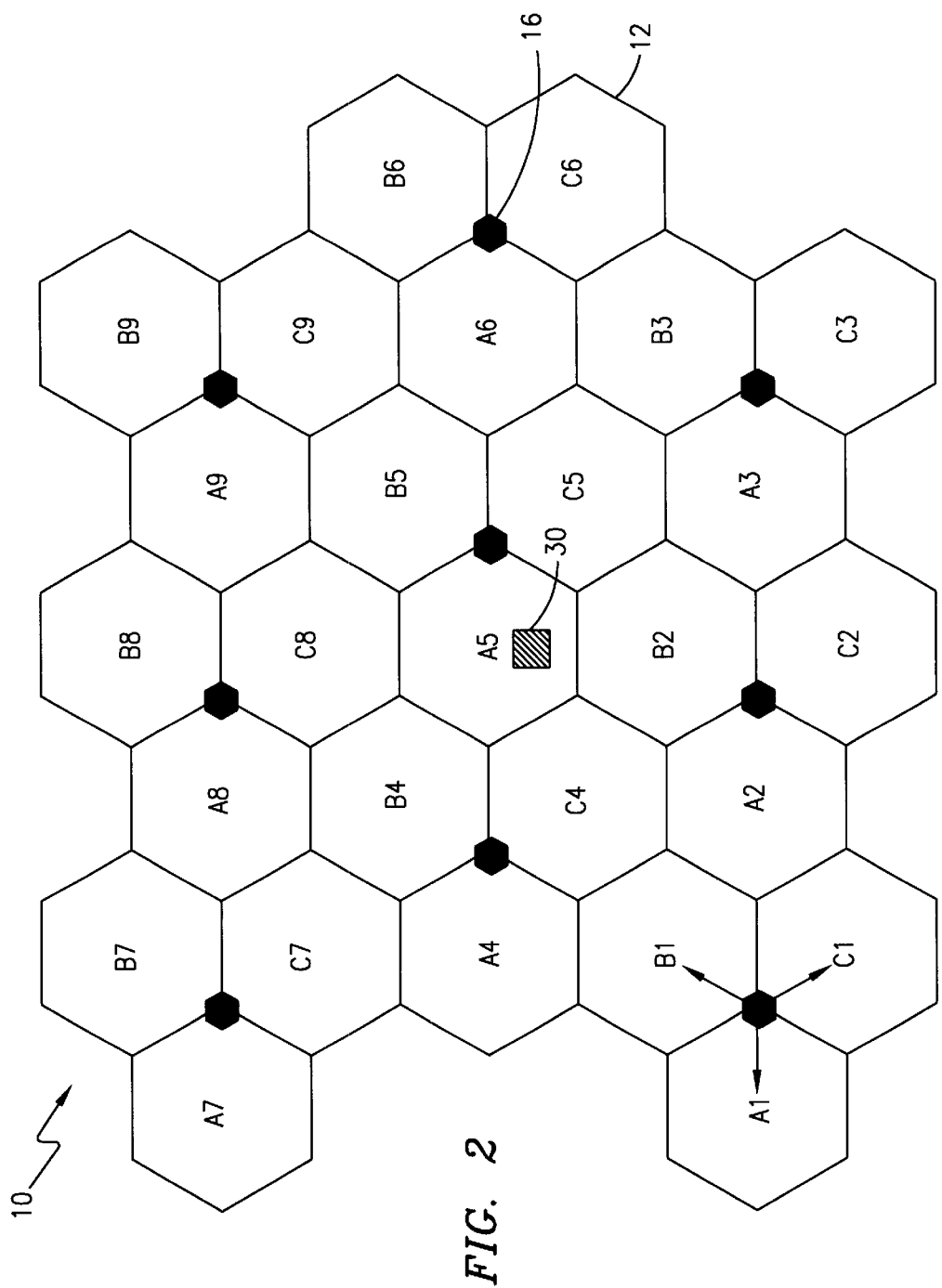
FIG. 2 is a schematic illustration of a 1/3 reuse pattern for a wide area cellular network.
Figure 3:
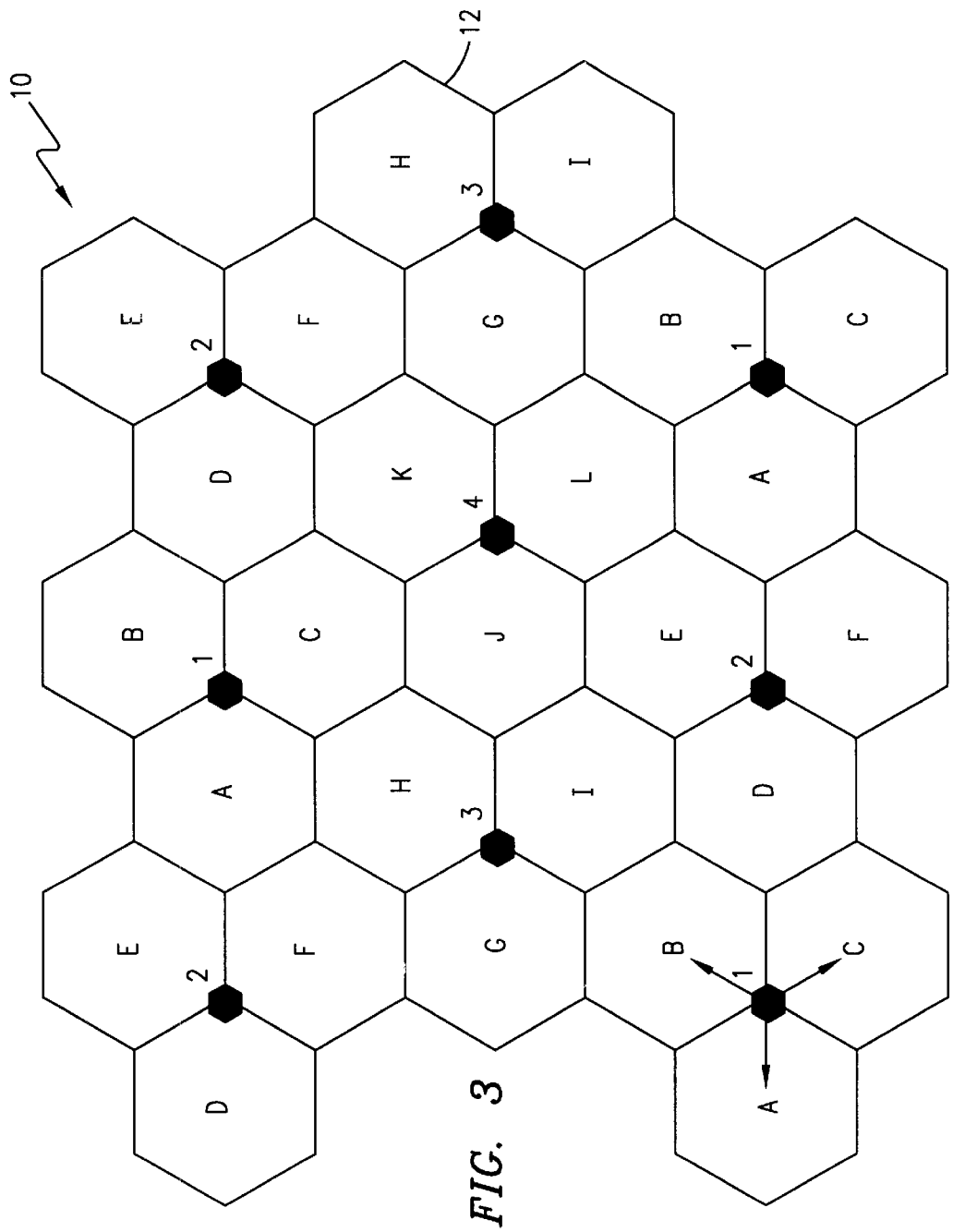
FIG. 3 is a schematic illustration of a 4/12 reuse pattern for a wide area cellular network.

Such measurements, however, are most reliable when the carrier is continuously used and is not power controlled. When a high-tier system deploys frequency hopping (FH), the frequencies within a single carrier are used repetitively, and the measurements are more difficult to interpret. Frequency hopping is, for example, specified in the standard GSM system. With frequency hopping, operation at a lower C/I is allowed, which can be translated into a capacity increase. In addition, the effort on reuse planning can be relaxed since all base station 16 sites may reuse the same frequency set, provided sectorization is deployed. In a 3-sector system, each radio site covers three different sectors (also called cells), for example, in FIG. 2 the respective BTSs 16 (designated by the dark hexagonal shapes) govern communications within the respective surrounding cells A, B and C. In the 1/3 sectorized reuse system shown in FIG. 2, the high-tier frequency set is, accordingly, divided into three sets, i.e., sets A, B, and C. Sectors with the same orientation, e.g., A1, A2 . . . A9, will reuse the same set of frequencies. In this manner there is a 3:1 sector reuse. Furthermore, every site will reuse all of the sets A, B, C, so there is a 1:1 site reuse. It should be understood, however, that for the broadcast control channels (BCCH), this scenario cannot be applied, since the frequencies/channels are not hopping (which would hinder the mobile 26 during the search for the BCCHs). Therefore, the system 10 requires a larger reuse factor, typically a 4/12 reuse pattern (4-site, 12-sector reuse), as illustrated in FIG. 3, in which four discrete sets of frequencies, i.e., (A, B, C), (D, E, F), (G, H, I) and (J, K, L) are used.

As is well understood in the cellular art, the BCCH plays a major role in cellular operations, acting as a reference for the moving mobile stations 26, indicating to them which cell 12 to camp on, and gives general information regarding the cellular parameters in the pertinent cell. In particular, in the GSM system, the BCCH broadcasts a BCCH Allocation (BA) list containing the Absolute Radio Frequency Channel Numbers (ARFCN) of the BCCH carriers within the surrounding cells, and a Cell Channel Description or Cell Allocation (CA) list, which may include up to 64 radiofrequencies or carriers over which the frequency hopping traffic channels are hopping. It should be understood that in the GSM system the CA list is only transmitted when frequency hopping is applied.

This downlink information from the overlaying cellular system 10 can be used advantageously by a low-tier system, such as the micro 20 and pico 24 systems, in order to derive which frequencies can be reused with minimal interference to and from the high-tier system. The downlink information can either be gathered by the low-tier base station, e.g., the MBTS 20 or PBTS 24, or the respective base station 16 can order a low-tier mobile station, e.g., a private mobile phone 28 (shown in FIG. 1) within the purview of MBTS 20B, to gather the information. In this manner the low-tier system, using the aforementioned BA list can tune into the BCCHs of neighboring cells 12, which in turn broadcast on their BCCH their own BA list and CA list. By putting together the neighboring BA lists and CA lists, the low-tier system can obtain a picture of which BCCH carriers are used in the surrounding cells 12, and which carrier frequencies are used for traffic channels (TCH) in those cells 12. By performing measurements on the ascertained BCCH carriers, the low-tier system can determine how much interference can be expected from each cell 12 around a given serving cell, e.g., cell 12A. coupling this information to the CA list associated with cell 12A, a low-tiered system, e.g., a pico system 24 therein, can determine which frequencies are suitable for reuse locally for low-tier communications.

An example better illustrates the operation. A worst case scenario is assumed with the aforedescribed 1/3 sectorized reuse FH high-tier system as in FIG. 2 in which the BCCHs have a 4/12 reuse pattern. Cells 12 are represented by a letter indicating the sector, and a numeral indicating the site, e.g., cell B3 represents sector B at site (BTS 16) 3. For a low-tier system 30 located in cell A5 (which is equally applicable for any other location), A5 is the serving cell 12. The broadcast channel of A5, designated by BCCH(A5), broadcasts the BA list for cell A5, which contains at least the BCCH carriers for neighboring cells B2, B4, C4, B5, C5, C8, and possibly more.

It should, of course, be understood that the selection of the BA list for cell A5 is based not only on geographical distances, but also on terrain conditions. For example, if there is a large obstruction between cells A5 and C8, then C8 would most likely not be included in the BA list of cell A5. On the other hand, if there is a low propagation loss from site 1, i.e., A1, B1 and C1, to cell A5, then BCCH(B1) would also be included in the BA list for cell A5.

The operator's selection of the BA list is part of their planning strategy for the high-tier system and depends on local conditions. Surrounding cells are generally included, but not necessarily all or only adjacent cells. If the low-tier system in cell A5 now tunes to, for example, the BCCH of cell C8, ie., BCCH(C8), the BA list broadcasted there contains the BCCH carriers of at least cells B4, A5, B5, A8, B8 and A9. Similar lists can be obtained from other surrounding cells whose BCCHs are listed in the BA list of the serving cell A5. In principle, a low-tier system could now tune to the BCCHs indicated in the BA list of surrounding cells, which are different from the BCCHs in the BA list of the serving cell. For example, the low-tier system such as system 30 could tune to BCCH(B8), and listen for a BA list there, instead of looking for the BCCH in the serving cell A5.

It should be understood, however, that due to the 4/12 BCCH reuse, the carrier used for BCCH (B8) is the same as the carrier for BCCH(B1), as further illustrated with reference to the corresponding cells 12 in FIG. 3. However, the BCCHs can be distinguished due to a unique base identification code sent on the BCCH, which is also referred to in the United States as a color code. In the GSM protocol, the BCCH contains a Base Station Identity Code (BSIC) which helps the mobile station 26 to distinguish between base stations 16 using the same BCCH carrier. For example, if BCCH(B8) is much weaker than BCCH(B1), the signals at the considered carrier can be attributed by the low-tier system to cell B1 rather than to cell B8 by applying the BSIC.

In addition to the BA list, when tuning to the BCCHs of the serving A5 and surrounding cells, the low-tier system 30 can also derive the CA lists. These lists contain the frequencies used for Traffic Channels (TCHs) in the different cells 12. For example, assuming the fully loaded 1/3 reuse scheme shown in FIG. 2, the CA lists of all A-cells will be the same, designated herein by CA__A; likewise for the B-cells, CA__B, and all C-cells, CA__C. Ignoring shadow fading due to obstructions, the low-tier system 30 in cell A5 will probably only have to deal with cells A5, B2, and C4 when it comes to interference. As an example, assume that the system operators use 9 frequencies, designated by ARFCN=1 to 9. The CA list for cell A may therefore be given as {1,4,7}, for cell B {2,5,8}, and for cell C {3,6,9}, for example. The low-tier system 30 now measures the RSSI on the BCCHs of the surrounding cells, generating a list 32 thereof, as shown in FIG. 4. The RSSI values in dBm depend among other things on propagation distance, antenna pattern and orientation, antenna height, BCCH transmit power, shadow fading (obstructions), and other such factors, as is understood in the art. It should, of course, be understood that the values in FIG. 4 are exemplary only. Nonetheless, these measurements may be considered quite accurate since the BCCH carrier is not hopping, no power control is applied, and the signal on the carrier is constant: idle times are filled with dummy bursts. This measured list 32 is subsequently ordered and the CA lists corresponding to the particular measured BCCHS are collected, generating an ordered list 34 thereof, as shown in FIG. 5. The strongest BCCH is preferably located at the top, i.e., BCCH (A5) having an RSSI value of −50 dBm and an associated CA list of {1, 4, 7}.

Figures 6, 7:
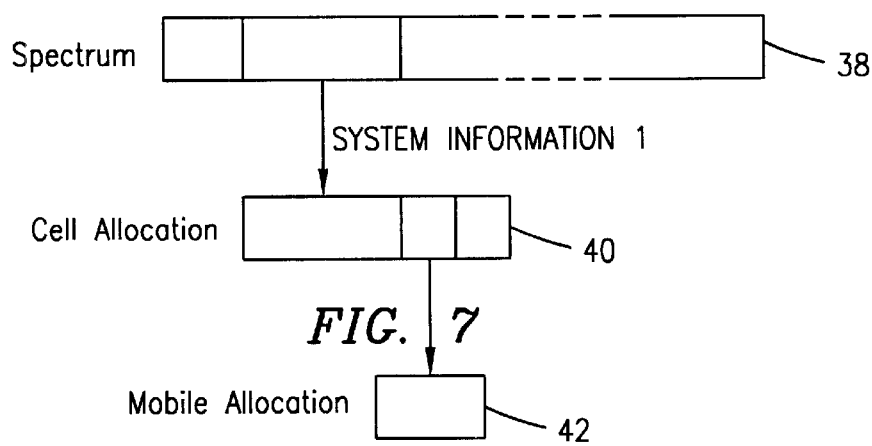
FIG. 6 further illustrates the candidate reusable frequencies of FIGS. 4 and 5, divided into candidate lists.
FIG. 7 also illustrates the candidate frequency selection mechanism of FIGS. 4–6.

The ordered list 34 of FIG. 5 is then subdivided into respective sublists 36A, 36B and 36C pursuant to the particular CA list encountered, as illustrated in FIG. 6. Sublist 36A, for example, contains but one CA list therein, i.e., the CA list for the FH frequencies {1,4,7} used in the serving cell A5. Sublist 36B, however, containing the CA list frequencies {2,5,8}, has four elements, ie., corresponding to cells B2, B1, B4 and B5. Similarly, sublist 36C, containing remaining frequencies {3,6,9}, has three elements therein, corresponding to cells C4, C8 and C5.

In the preferred embodiment of the present invention, the method and system select that list having the smallest maximum value, which in FIG. 6 is the frequency set {3,6,9} since the lowest RSSI value of −65 dBm is there. Consequently, the CA list of BCCH(C4), i.e., CA__C or {3,6,9}, has been derived by the low-tier system 30 in serving cell A5 for use therein.

With reference now to FIG. 7, there is shown in more detail a preferred mechanism for implementing the system and method of the present invention. As discussed, downlink information from the overlaying cellular system 10 is received by the micro 20 or pico 24 systems or mobile terminals connected thereto. A portion of the spectrum, generally designated by the reference numeral 38, allocated to the system 10 operator, e.g., SYSTEM INFORMATION TYPE 1, contains information such as the frequencies allowed for use in the serving cell, i.e., cell A5 in FIG. 2. The aforedescribed system information, generally designated by the reference numeral 40, contains a field therein, i.e., the aforementioned Cell Channel Description or Cell Allocation (CA), which contains up to 64 radiofrequency (RF) frequencies. During a call setup, such as involving mobile subscriber terminal 26 in FIG. 1, the cellular system 10 tells the MS 26 the type of channel, i.e., frequency hopping or non-FH, desired. In particular, the MS 26 in the cellular system 10 learns the type of channel in an IMM ASSIGN message thereto, found in the aforedescribed CA field, which notifies the MS 26 not only if hopping is desired, but what hopping sequence to use (via a Hop Sequence Number of HSN) and what phase offset (Mobile Allocation Index Offset or MAIO) in the sequence to use, found in a Mobile Allocation field of the CA information 40 and generally designated herein by the reference numeral 42. The resulting subset 42 may contain all frequencies in the CA list (up to 64) or less.

The derived frequency list can now be used by the low-tier system 30 in a conventional adaptive channel allocation list to select a single communication channel, as described in Applicant's aforementioned patent application entitled, "Method and System for Autonomously Allocating a Cellular Communications Channel for Communication Between a Cellular Terminal and a Telephone Base Station," U.S. patent application Ser. No. 08/704,846, filed Aug. 28, 1996, or it can be used to random frequency hop, as described in Applicant's patent application, "Method and System for Autonomously Allocating a Frequency Hopping Traffic Channel in a Private Radio System," U.S. patent application Ser. No. 08/847,524, filed Apr. 24, 1997.

It should be understood that the method works equally well for use with other reuse factors for low-tier systems 30 located in cells 12 other than A5, although different BA lists and CA lists will, of course, be found. The system and method of the present invention is also adaptive, provided the routine is carried out periodically. Accordingly, if the high-tier system 30 is replanned, the BA and CA lists will change, and the low-tier system 30 adapts correspondingly.

The previous description is of preferred embodiments for implementing the invention, and the scope of the invention should not necessarily be limited by this description. The scope of the present invention is instead defined by the following claims.

What is claimed is:

1. A method for determining a least-interfered radio communications link for a private radio system within a serving cell of an overlaying cellular system, the private radio system and the overlaying cellular system sharing a plurality of frequencies within said serving cell, said overlaying cellular system employing frequency hopping, the method comprising the steps of:

transmitting broadcast information on broadcast control channels (BCCHs);

determining, using the broadcast information, a set of frequency hopping channels being used within a plurality of cells surrounding said serving cell of said overlaying cellular system;

performing periodic received signal strength indicator (RSSI) measurements on BCCH carrier frequencies of a plurality of cells surrounding said serving cell, each said frequency hopping channel having at least one of said RSSI measurements associated therewith;

dividing said set of frequency hopping channels into a plurality of frequency hopping lists, each said frequency hopping channel corresponding to a respective one of said frequency hopping lists, wherein each frequency hopping list has associated therewith the RSSI measurements that are associated with the corresponding frequency hopping channels of said frequency hopping lists;

selecting a given one of said frequency hopping lists having the lowest maximum associated RSSI measurement value; and adaptively selecting a given frequency hopping channel from said given one of said frequency hopping lists as the least-interfered radio communications link for said private radio system.

2. The method according to claim 1, wherein, prior to said step of determining, said method further comprises the steps of:

receiving, within said private radio system, downlink information from a given cell of said cellular system.

3. The method according to claim 2, wherein said given cell is the serving cell.

4. The method according to claim 2, wherein said given cell is one of said surrounding cells.

5. The method according to claim 2, wherein, in said step of determining, said determination excludes frequency hopping channels for said serving cell.

6. The method according to claim 1, wherein, prior to said step of determining, said method further comprises the steps of:

receiving, within said private radio system, downlink information from a broadcast control channel of said serving cell;

extracting from said downlink information a plurality of other broadcast control channels for a corresponding plurality of said surrounding cells;

receiving, within said private radio system, a plurality of surrounding cell downlink information from said plurality of other broadcast control channels;

measuring respective RSSI measurements associated with each of said other broadcast control channels; and extracting, from the respective surrounding cell downlink information from said other broadcast control channels, respective frequency hopping channels associated with each said other broadcast control channel, said extracted frequency hopping channels forming said frequency hopping channel set.

7. The method according to claim 1, wherein, after said step of determining, said method further comprises the step of:

ordering said frequency hopping channels within said frequency hopping channel set pursuant to the respective RSSI measurements associated with said frequency hopping channels.

8. The method according to claim 1, wherein said determination of said set of frequency hopping channels is made within a private radio base station of said private radio system.

9. The method according to claim 1, wherein, after said step of determining, said set of frequency hopping channels are forwarded to said private radio system by a remote device, said determination of said set of frequency hopping channels being made within said remote device.

10. The method according to claim 9, wherein said remote device forwards said set of frequency hopping channels to said private radio system via a wireless communication.

11. The method according to claim 9, wherein said remote device is a mobile terminal in communication with said private radio system.

12. The method according to claim 9, wherein said set of frequency hopping channels is downloaded into said remote device via cellular Short Message Service.

13. The method according to claim 1, wherein said set of frequency hopping channels is downloaded into the private radio system via a wireline connection.

14. The method according to claim 1, wherein in said step of determining, the interference measurement associated with each said frequency hopping channel in said set includes a signal strength value of the respective surrounding cell control channel associated therewith.

15. The method according to claim 1, wherein said method further comprises the steps of:

generating a first list of BCCH carrier frequency RSSI measurements;

ordering said first list based on the periodic RSSI measurements performed on said BCCH carrier frequencies;

collecting respective associated Cell Allocation (CA) lists corresponding to said measured BCCH carrier frequencies; and ordering each said frequency hopping channel in each of said frequency hopping lists pursuant to the respective associated RSSI measurement, the respective BCCH carrier frequency having the maximum RSSI measurement value in each ordered frequency hopping list being at one end of each said ordered frequency hopping list.

16. The method according to claim 1, wherein said cellular system employs both frequency hopping and non-frequency hopping communications.

17. The method according to claim 1, wherein said given frequency hopping channel comprises a multiplicity of frequencies over which said private radio system may frequency hop within said serving cell of said overlaying cellular system.

18. The system according to claim 1, wherein said BCCH carrier frequencies are non-hopping, have a constant transmit power, and have a continuous (non-bursty) signal.

19. The method according to claim 1, wherein the periodic RSSI measurements need only be performed on said BCCH carrier frequencies.

20. The method according to claim 1, wherein the periodic RSSI measurements performed on each said BCCH carrier frequency further indicates a signal strength of said respective associated frequency hopping channels corresponding to said respective one of said frequency hopping lists without explicitly measuring RSSI on said set of frequency hopping channels.

21. The method according to claim 1, wherein the set of frequency hopping channels is determined by utilizing at least one of the following:
    BCCH Allocation (BA) lists and Cell Allocation (CA) lists, the BA and CA lists, when combined, determines which BCCH carrier frequencies are used in the plurality of cells surrounding said serving cell and which carrier frequencies are used for traffic channels (TCH) in said plurality of surrounding cells;
    RSSI measurements periodically performed on said BCCH carrier frequencies; and
    Base Station Identity Codes (BSICs).

22. In a communication system having a private radio system within a serving cell of an overlaying cellular system, the private radio system and the overlaying cellular system sharing a plurality of frequencies within said serving cell, said overlaying cellular system employing frequency hopping, circuitry within said private radio system for allocating a least-interfered radio communications link, said circuitry comprising:
    transmission means for transmitting broadcast information on broadcast control channels (BCCHs);
    determining means for determining, using the broadcast information, a set of frequency hopping channels for use by said private radio system within said serving cell;
    means for performing periodic received signal strength indicator (RSSI) measurements on BCCH carrier frequencies of a plurality of cells surrounding said serving cell, each said frequency hopping channel having at least one of said RSSI measurements associated therewith;
    dividing means for dividing said set of frequency hopping channels into a plurality of frequency hopping lists, each said frequency hopping channel corresponding to a respective one of said frequency hopping lists, wherein each frequency hopping list has associated therewith the RSSI measurements that are associated with the corresponding frequency hopping channels of said frequency hopping lists;
    selection means for selecting a given one of said frequency hopping lists having the lowest maximum associated RSSI measurement value; and
    selection means for adaptively selecting a given frequency hopping channel from said given one of said frequency hopping lists as the least-interfered radio communications link for said private radio system.

23. The system according to claim 22, wherein said communication system employs both frequency hopping and non-frequency hopping communications, the non-frequency hopping communications including BCCH carrier frequencies of serving and surrounding cells of said overlaying cellular system, and the frequency hopping communications including radio frequencies used for traffic channels (TCHs) in said serving and surrounding cells of said overlaying cellular system.

24. A method for determining a least-interfered radio communications link for a private radio system within a serving cell of an overlaying cellular system, the private radio system and the cellular system sharing a plurality of frequencies within the serving cell, the overlaying cellular system employing frequency hopping, the method comprising the steps of:
    transmitting broadcast information on broadcast control channels (BCCHs);
    determining, using the broadcast information, a set of frequency hopping channels being used within a plurality of cells surrounding the serving cell of the overlaying cellular system;
    performing periodic received signal strength indicator (RSSI) measurements on BCCH carrier frequencies of a plurality of cells surrounding the serving cell, each said frequency hopping channel having at least one of the RSSI measurements associated therewith, the periodic RSSI measurements being performed on each BCCH carrier frequency without explicitly measuring RSSI on the set of frequency hopping channels;
    dividing the set of frequency hopping channels into a plurality of frequency hopping lists, each said frequency hopping channel corresponding to a respective one of the frequency hopping lists, wherein each frequency hopping list has associated therewith the RSSI measurements that are associated with the corresponding frequency hopping channels of the frequency hopping lists;
    selecting a given one of the frequency hopping lists having the lowest maximum associated RSSI measurement value; and
    adaptively selecting a given frequency hopping channel from the given one of the frequency hopping lists as the least-interfered radio communications link for the private radio system.

25. The method according to claim 24, wherein the method further comprises the steps of:
    combining the RSSI measurements, BCCH Allocation (BA) lists and Cell Allocation (CA) lists;
    determining, using the combination, which BCCH carrier frequencies are suited for reuse in the serving cell;
    generating a first list of BCCH carrier frequency RSSI measurements;
    ordering the first list based on the periodic RSSI measurements performed on the BCCH carrier frequencies;
    collecting respective associated Cell Allocation (CA) lists corresponding to the measured BCCH carrier frequencies; and
    ordering each said frequency hopping channel in each of the frequency hopping lists pursuant to the respective associated RSSI measurement, the respective BCCH carrier frequency having the maximum RSSI measurement value in each ordered frequency hopping list being at one end of each said ordered frequency hopping list.

26. A communication system comprising:
    an overlaying cellular system, the overlaying cellular system employing frequency hopping; and
    a private radio system within a serving cell of the overlaying cellular system, the private radio system using both non-frequency hopping and frequency hopping communications wherein the non-frequency hopping communications including BCCH carrier frequencies of serving and surrounding cells of the overlaying cellular system and the frequency hopping communications including radio frequencies used for traffic channels (TCHs) in the serving and surrounding cells of the overlaying cellular system, the private radio system having circuitry for allocating a least-interfered radio communications link, the circuitry being further adapted for:

transmitting broadcast information on broadcast control channels (BCCHS);

determining, using the broadcast information, a set of frequency hopping channels for use by the private radio system within the serving cell;

performing periodic received signal strength indicator (RSSI) measurements on BCCH carrier frequencies of a plurality of cells surrounding the serving cell, each said frequency hopping channel having at least one of the RSSI measurements associated therewith;

dividing the set of frequency hopping channels into a plurality of frequency hopping lists, each said frequency hopping channel corresponding to a respective one of the frequency hopping lists, wherein each frequency hopping list has associated therewith the RSSI measurements that are associated with the corresponding frequency hopping channels of the frequency hopping lists;

selecting a given one of the frequency hopping lists having the lowest maximum associated RSSI measurement value; and selecting a given frequency hopping channel from the given one of the frequency hopping lists as the least-interfered radio communications link for the private radio system.

\* \* \* \* \*